United States Patent [19]

Williams et al.

[11] Patent Number: 4,941,734

[45] Date of Patent: Jul. 17, 1990

[54] BEAM ALLOCATION AND DELIVERY SYSTEM FOR EXCIMER LASER

[75] Inventors: Richard T. Williams, Winston-Salem; Jeff C. Wu, Clemmons, both of N.C.

[73] Assignee: AMP Incorporated, Harrisburg, Pa.

[21] Appl. No.: 273,381

[22] Filed: Nov. 18, 1988

[51] Int. Cl.⁵ ............................................. G02B 27/00
[52] U.S. Cl. ................................... 350/321; 350/169; 350/96.26; 250/227.28
[58] Field of Search ............ 350/321, 319, 169, 96.11, 350/96.23, 96.25, 96.26, 96.13, 96.10, 96.15; 250/227, 578, 228, 458.1

[56] References Cited

U.S. PATENT DOCUMENTS

| | | | |
|---|---|---|---|
| 3,753,607 | 8/1973 | Kitano et al. | 350/96.25 |
| 4,414,344 | 12/1968 | Mukojima | 350/169 |
| 4,641,912 | 2/1987 | Goldenberg | 350/96.10 |
| 4,732,448 | 3/1988 | Goldenberg | 350/96.26 |
| 4,824,209 | 4/1989 | Bolton et al. | 350/319 |

Primary Examiner—Eugene R. LaRoche
Assistant Examiner—Loha Ben
Attorney, Agent, or Firm—William B. Noll

[57] ABSTRACT

The present invention is directed to a beam allocation and delivery system for an excimer laser in which substantially the full energy from such laser is delivered to a precise area or areas of a workpiece. This efficient system is achieved by the use of one or more elongated light-guides to direct the laser beam. Included therewith are means to shape and focus said beam to a reduced image on the workpiece. Preferably, the shaping and focussing is achieved by changing the cross-section of the light-guide from a first configuration to a second configuration, and by an imaging lens.

4 Claims, 1 Drawing Sheet

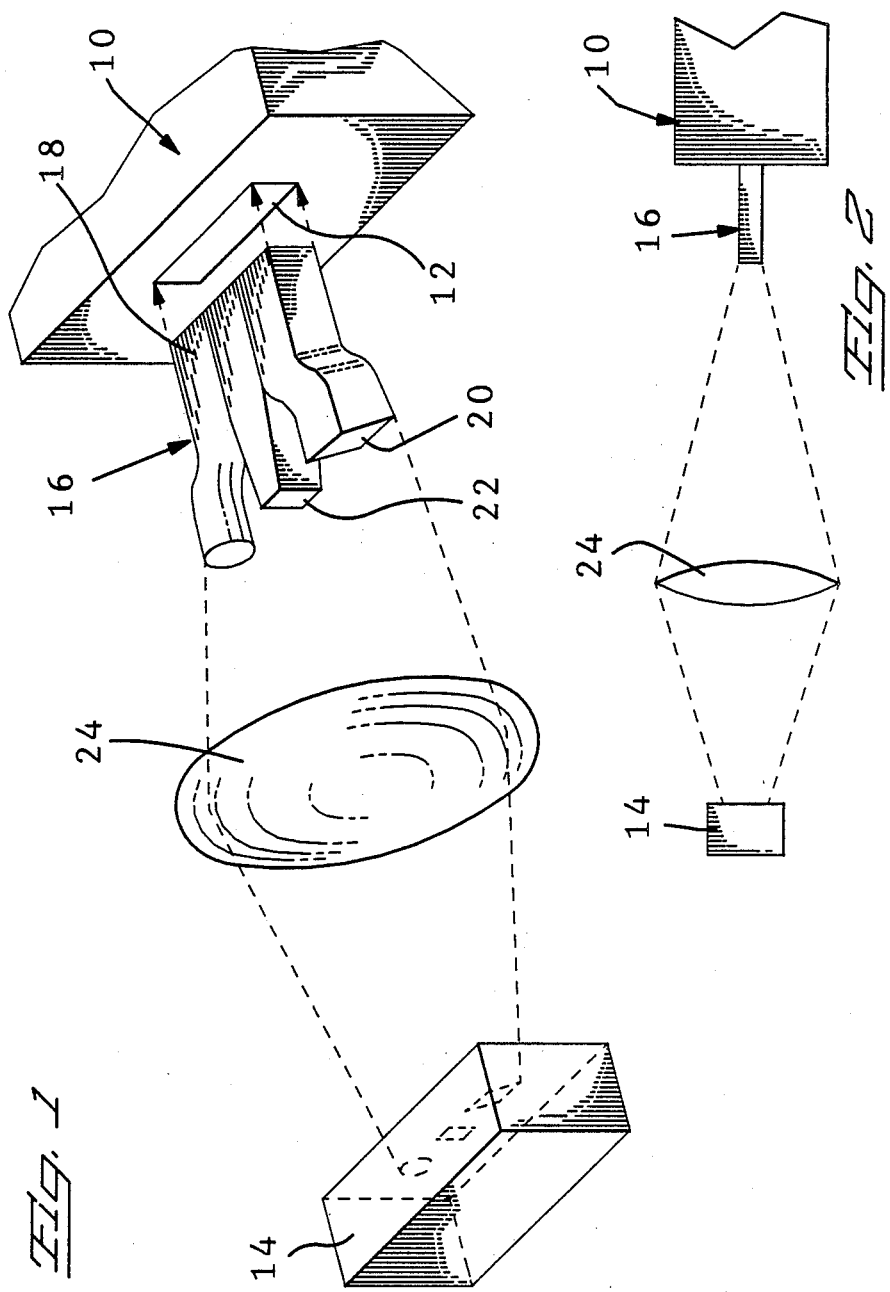

BEAM ALLOCATION AND DELIVERY SYSTEM FOR EXCIMER LASER

FIELD OF THE INVENTION

This invention relates to a more efficient system of delivering and focussing a laser beam on a controlled or precisely defined area of a workpiece.

BACKGROUND OF THE INVENTION

This invention is directed to apparatus to efficiently and more effectively focus a laser beam, preferably the use of an excimer laser for the purpose of laser assisted plating, onto a workpiece.

A preferred embodiment of this invention lies in the practice of laser assisted plating of electrical terminals. Typically, such terminals are stamped and formed from metal strip and are attached to a carrier strip which is useful for strip feeding the terminals through successive manufacturing operations. The final manufacturing operation involves plating the electrical contact surfaces of the strip fed terminals with precious metal or semi-precious metal, such as gold or alloys thereof. Such metals are characterized by good electrical conductivity and little or no formation of oxides that reduce said conductivity. Therefore these metals, when applied as plating, will improve conductivity of the terminals. However, the high cost of these metals has necessitated precision deposition on the contact surfaces of the terminals, and not on surfaces of the terminals on which plating is not necessary. Precision deposition is therefore very critical to a cost effective operation.

There are conventional selective plating practices which do not utilize lasers, but rather relate to apparatus which includes a rotating mandrel for guiding terminals through a plating solution. See. U.S. Pat. Nos. 4,555,321 and 4,473,445. One difficulty associated with such apparatus is the ability to control the precious metal deposition to extremely small contact areas, and the close proximity of adjacent terminals on a carrier strip.

The introduction of laser technology to the plating process has resulted in new approaches to such process. For example, in co-pending application, Ser. No. 133,779, now U.S. Pat. No. 4,832,798, assignee herein, a technique is taught whereby the porosity of a nickel plated substrate is significantly reduced by a laser beam to permit a reduction in the level of precious metal plating needed on such nickel to produce a good electrical contact surface.

U.S. Pat. No. 4,348,263 to Draper et al and directed to a process for surface melting of a substrate prior to plating, teaches a method of making an electrical contact by the steps of applying a first protective layer to a substrate, subjecting said protective layer and a portion of said substrate to melting by means of an electron beam or laser prior to the deposition. A related work by Draper, published in the *Gold Bulletin*, 1986, 19, entitled "Laser Surface Alloying of Gold," contains an illustrated showing on the mechanism of laser surface alloying by the use of focussed laser pulsing.

Laser assisted plating may consist of improving the substrate prior to plating; precise removal of a plating resist to expose defined contact plating areas; or, laser plating in vacuum. The latter two techniques are taught, respectively, in co-pending application, Ser. No. 180,417, now U.S. Pat. No. 4,877,644, and owned by the assignee herein, and U.S. Pat. No. 4,427,723 to Swain.

Said co-pending application teaches a method for the selective plating of a metal substrate, which method includes the steps of selecting a laser wavelength which is strongly absorbed by the metal substrate, i.e. reflectivity of less than about 70%, choosing a polymer based plating resist having a low optical coefficient of absorption to a laser wavelength, typically between about 248 to 360 nm, curing said resist, prefereably subjecting selective areas of said resist to a single excimer laser shot, having a wavelength between about 248 to 360 nm, to heat the metal substrate and thereby cause ablative removal of the resist over the selective areas of said substrate, and subjecting said exposed portions of said substrate to metal plating.

The Swain patent teaches a method and apparatus for vacuum depositing and annealing, wherein a coating material is evaporated by the action of a laser beam, while the substrate to be coated is scanned by another laser beam to cause localized heating and depositing of the coating material on the substrate.

In such practices utilizing an excimer laser or other such laser producing a characteristially broad output beam, whose size and shape at the laser exit are determined mainly by the discharge electrodes and hence are beyond control of the user, there has been no apparent attempt to direct or transmit the laser beam in a way to substantially utilize the full energy of the laser beam. Specifically, in material processing with excimer lasers, a specific interaction area is generally defined by utilizing an aperture to restrict the beam. When an aperture with a small opening is used, a large portion of the beam is wasted, since excimer lasers tyically have large-area output beams. The alternative of focusing the entire beam onto the area of a small aperture can damage the aperture and optics and will increase the beam divergence. A mask with multiple apertures placed within the beam cross section can give a degree of parallel processing, but the fraction of light wasted between apertures may still be large, and the desired mask pattern may not match the shape of the beam.

The present invention avoids the wasteful processing described above by a system which fully utilizes the energy of the laser. Such system comprises an excimer laser emitting a beam having a predetermined cross-section, one or more elongated light-guides, i.e. rods, strips or fibers, to direct said beam, where the cross-sections thereof are sufficient to completely fill said laser beam cross-section, and means for shaping and focussing said beam to a reduced image on a workpiece.

The features of this invention will become apparent in the description which follows, particularly when read in conjunction with the accompanying drawings.

BRIEF DESCRIPTION OF DRAWINGS

"FIG. 1 is an enlarged perspective view of the excimer beam reshaping system according to the practice of this invention.

FIG. 2 is a simplified plan view of the system depicted in FIG. 1."

BRIEF SUMMARY OF THE INVENTION

The present invention is directed to a beam allocation and delivery system for an excimer laser in which substantially the full energy from such laser is delivered to a precise area or areas of a workpiece. This efficient system is achieved by the use of one or more elongated light-guides to direct the laser beam. Included therewith are means to shape and focus said beam to a reduced image on the workpiece.

DETAILED DESCRIPTION OF PREFERRED EMBODIMENT

The present invention is directed to a beam allocation and delivery system which fully utilizes the energy of an excimer laser beam focussed toward a workpiece. The purpose of directing said beam to a workpiece, such as a carrier strip containing a plurality of spaced apart electrical terminals, may be to effect surface changes in the workpiece, ablate precise areas of a plating resist on said workpiece, and/or effect plating of said workpiece by a transfer mechanism.

The significance of this invention may best be appreciated by considering the technology of lasers. In the field of laser applications there are several commerical units which operate at different wavelengths. For example, excimer lasers form a group of pulsed high-pressure rare gas halide lasers which emit various ultraviolet wavelengths, depending on the lasing medium, such as 193 nm, 248 nm, 308 nm and 351 nm. At the opposite end of the spectrum, operating in the infrared region are such lasers whose laser sources are carbon dioxide ($CO_2$), and neodymium doped yttrium-aluminum garnet (Nd:YAG). By way of example and comparison, representative wavelengths for the three commercial laser units are as follows:

Excimer 193, 248, 308, 351 nm
$CO_2$ 10,600 nm
Nd:YAG 1,064 nm

Excimer lasers have been found to be particularly effective in laser assisted plating by the fact that the wavelength range is especially suitable for coupling with the metal substrate, or the plating resist. Accordingly, the further description will be limited to the use of excimer lasers having the performance parameters* depicted in TABLE I.

TABLE I

|  | ArF | KrCl | KrF | XeBr | XeCl | XeF |
|---|---|---|---|---|---|---|
| Wavelength (nm) | 193 | 222 | 248 | 282 | 308 | 351 |
| Output energy (J/pulse) | 0.2 | 0.05 | 0.25 | 0.01 | 0.08 | 0.08 |
| Repetition rate (Hz) | 100 | 100 | 150 | 100 | 150 | 100 |
| Pulse width (ns) | 10–20 | 5–15 | 10–20 | 7–20 | 4–20 | 10–20 |
| Beam size | | | 1 × 2.5 cm | | | |
| Beam divergence | | | 2 × 5 mrad | | | |

*parameters supplied by "Laser Processing and Analysis of Materials", by W. W. Duley - Plenum Press, 1983

A significant parameter of an excimer laser is the rather large beam size, typically rectangular in shape having dimensions of about 1×2.5 cm. Typically, as described above, it is necessary to reduce and modify the rectangular shape thereof to a diamond-shape, for example, the dimensions of which are 20×30 mils. The beam reduction and focusing are achieved by a combination of shaping apertures and imaging lens, but only at the expense of wasting energy.

The present invention eliminates such waste by the system illustrated schematically in the Figures. Briefly, as illustrated thereby, this invention deals with a system of utilizing almost all of the excimer laser beam energy by a beam allocation system which accepts the entire beam and parcels it into the desired pattern of illuminated apertures, which may have almost any shape and arrangement. The system is made up of a number of quartz light-guides (rods, strips, or fibers), one end of which is a single bundle the size and shape of the laser beam, and the other end of which is bent, bundled, or otherwise shaped into the desired pattern. Typically, this pattern will be imaged onto the workpiece by a lens system, at some demagnification factor which achieves the necessary power density on the workpiece while avoiding optical damage of the light-guide. The length of the light-guide is kept small, i.e. less than about 10 cm., so that ultraviolet attenuation is acceptably low with available materials, such as fused silica.

Returning now to the Figures, the excimer laser 10 emits a beam having a broad rectangular cross-section 12. Disposed between the laser 10 and the target area of the workpiece 14, is one or more elongated light-guides 16 capable of transmitting the laser beam. The light-guides 16 may comprise quartz or high-purity fused silica which may be shaped to bend the beam, or configured to a different cross-section, i.e. rectangular to diamond-shaped, or rectangular to circular. By this arrangement, the light-guides 16 provide separation and definition of the laser beam into useful portions. For greatest energy efficiency, the laser side 18 of the light-guides 16 should have a cross-section which fills the laser beam cross-section 12. On the other hand, latitude is provided for the opposite end 20 of the straight or bent with an end face 22 different from that of the laser side 18 of the light-guides. In other words, the end face may be configured to the general shape of the desired image to be focussed upon the workpiece. Additionally, the light-guides may be shaped so as to present the end faces in a proper relationship, which when focused by an imaging lens 24 will provide the focused reduced images in the proper spaced relationship for the workpiece. This is particularly critical as terminal contacts on a continuous carrier strip are spaced close together at precise dimensional distances. Thus, by this invention, processing of multiple parts or multiple areas on the same part can be achieved in a single laser shot. The processing speed can be improved and the operation cost reduced. It should be understood, however, in those situations where the imaging lens 24 is not large enough to adequately cover the entire laser beam, a mask may be used between such lens 24 and end faces 22 to ensure such lens is suitably sized.

We claim:

1. An efficient system for reshaping a fixed, generally rectangular excimer laser beam and focussing such reshaped beam onto a workpiece remote from a source of said excimer laser beam, the system comprising an excimer laser emitting a generally rectangular beam, a first end of at least one elongated fibrous or solid light-guide disposed adjacent the beam source, where the cross-section of said first end of said elongated fibrous of solid light-guide is of a first size sufficient to fully accept said rectangular beam, and a remote end of said elongated fibrous or solid light-guide is of a second size, smaller than the first size of "diamond" shaped cross-section whereby to direct said laser beam onto a workpiece disposed a distance therefrom, said beam being transmitted through said elongated fibrous or solid light-guide and reshaped from rectangular to "diamond" shaped, and focused onto said workpiece by an imaging lens.

2. The laser beam reshaping system according to claim 6, wherein said imaging lens is located between said elongated fibrous or solid light-guide and said workpiece.

3. The laser beam reshaping system according to claim 1, wherein said system is a component of a laser assisted plating operation, and that said workpiece is the product to be plated.

4. The laser beam reshaping system according to claim 1, wherein the length of said elongated fibrous or solid light-guide is less than about 10 cm.

* * * * *

UNITED STATES PATENT AND TRADEMARK OFFICE
CERTIFICATE OF CORRECTION

PATENT NO. : 4,941,734

DATED : July 17, 1990

INVENTOR(S) : Richard Taylor Williams, Jeff Cherng-Chou Wu

It is certified that error appears in the above-identified patent and that said Letters Patent is hereby corrected as shown below:

In column 4, claim 2, line 58, the number "6" should be --1--.

Signed and Sealed this

Eighth Day of October, 1991

Attest:

HARRY F. MANBECK, JR.

*Attesting Officer*      *Commissioner of Patents and Trademarks*